United States Patent
Nasman et al.

(10) Patent No.: US 11,339,719 B2
(45) Date of Patent: May 24, 2022

(54) FLUID DELIVERY SYSTEM FOR ROTATIONAL EQUIPMENT

(71) Applicant: Raytheon Technologies Corporation, Farmington, CT (US)

(72) Inventors: Benjamin Nasman, Tolland, CT (US); Michael M. Davis, North Granby, CT (US)

(73) Assignee: Raytheon Technologies Corporation, Farmington, CT (US)

(*) Notice: Subject to any disclaimer, the term of this patent is extended or adjusted under 35 U.S.C. 154(b) by 187 days.

(21) Appl. No.: 16/859,328

(22) Filed: Apr. 27, 2020

(65) Prior Publication Data

US 2021/0332758 A1    Oct. 28, 2021

(51) Int. Cl.
| | |
|---|---|
| F01D 25/18 | (2006.01) |
| F16J 15/34 | (2006.01) |
| F02C 7/22 | (2006.01) |
| F23R 3/28 | (2006.01) |

(52) U.S. Cl.
CPC .............. *F02C 7/222* (2013.01); *F01D 25/18* (2013.01); *F01D 25/183* (2013.01); *F16J 15/3404* (2013.01); *F16J 15/3452* (2013.01); *F23R 3/28* (2013.01)

(58) Field of Classification Search
CPC . F02C 7/06; F01M 11/02; F01D 25/18; F01D 25/183; F16J 15/3404; F16J 15/3452
USPC ....................................................... 415/115
See application file for complete search history.

(56) References Cited

U.S. PATENT DOCUMENTS

| | | | |
|---|---|---|---|
| 3,025,115 A | 3/1962 | Shevchenko |
| 3,698,725 A | 10/1972 | Klabunde |
| 3,964,753 A | 6/1976 | Junker |
| 4,406,459 A | 9/1983 | Davis |
| 4,523,764 A | 6/1985 | Albers |
| 4,905,637 A | 3/1990 | Ott |
| 5,658,127 A | 8/1997 | Bond |
| 5,813,674 A | 9/1998 | Dickie |
| 6,655,693 B2 | 12/2003 | Hosanna |
| 6,758,598 B2 | 7/2004 | Beauvais |
| 7,265,467 B2 | 9/2007 | Sumi |
| 7,410,341 B2 | 8/2008 | Gockel |
| 7,998,238 B2 | 8/2011 | Takayama |
| 8,845,282 B2 | 9/2014 | Lapierre |
| 8,920,034 B2 | 12/2014 | Galivel |

(Continued)

FOREIGN PATENT DOCUMENTS

CN    108644019 A    10/2018

OTHER PUBLICATIONS

EP Search Report for EP21170798.9 dated Jan. 24, 2022.

*Primary Examiner* — J. Todd Newton
(74) *Attorney, Agent, or Firm* — Getz Balich LLC (57) ABSTRACT

An assembly is provided for rotational equipment. This assembly includes a first component, a static structure, a guide rail and a second component. The static structure includes a static structure fluid passage. The guide rail is mounted to the static structure. The guide rail includes a guide rail fluid passage and a nozzle. The guide rail fluid passage fluidly couples the static structure fluid passage to a nozzle orifice of the nozzle. The nozzle is configured to direct fluid onto the first component through the nozzle orifice. The second component is mated with and configured to translate along the guide rail.

20 Claims, 8 Drawing Sheets

(56) References Cited

U.S. PATENT DOCUMENTS

| | | |
|---|---|---|
| 8,944,691 B2 | 2/2015 | Chumokhvalov |
| 10,288,163 B2 | 5/2019 | Miller |
| 11,187,093 B2 | 11/2021 | Trivedi |
| 2004/0154578 A1 | 8/2004 | Weaver |
| 2013/0014513 A1* | 1/2013 | Barnett .................... F02C 7/32 60/772 |
| 2013/0136583 A1* | 5/2013 | Colombo ................ F16J 15/46 415/173.2 |
| 2016/0348522 A1 | 12/2016 | Labbe |
| 2016/0376947 A1* | 12/2016 | Lucas .................... F01D 25/18 184/6.11 |
| 2017/0350275 A1* | 12/2017 | Von Berg ................. F16N 7/34 |
| 2018/0347389 A1 | 12/2018 | Prenger |
| 2020/0080478 A1 | 3/2020 | Rogers |
| 2020/0131936 A1* | 4/2020 | Amador ................ F01D 25/183 |
| 2020/0386168 A1* | 12/2020 | Nasman ................... F02C 9/50 |
| 2020/0386318 A1* | 12/2020 | Nasman ............... F16J 15/3464 |
| 2021/0332886 A1* | 10/2021 | Nasman ............... F16J 15/3452 |
| 2021/0332888 A1* | 10/2021 | Nasman ............... F16J 15/3416 |
| 2021/0332889 A1* | 10/2021 | Nasman ................ F16J 15/342 |

* cited by examiner

FLUID DELIVERY SYSTEM FOR ROTATIONAL EQUIPMENT

BACKGROUND OF THE DISCLOSURE

1. Technical Field

This disclosure relates generally to rotational equipment and, more particularly, to fluid delivery to a component within a piece of rotational equipment.

2. Background Information

Rotational equipment such as a gas turbine engine may include a fluid delivery system for delivering lubricant and/or coolant to one or more components within the gas turbine engine. As engine designs continue to progress, space available within the gas turbine engine continues to decrease making it more and more difficult to utilize traditional fluid delivery system components. There is a need in the art therefore for an improved fluid delivery system.

SUMMARY OF THE DISCLOSURE

According to an aspect of the present disclosure, an assembly is provided for rotational equipment. This assembly includes a first component, a static structure, a guide rail and a second component. The static structure includes a static structure fluid passage. The guide rail is mounted to the static structure. The guide rail includes a guide rail fluid passage and a nozzle. The guide rail fluid passage fluidly couples the static structure fluid passage to a nozzle orifice of the nozzle. The nozzle is configured to direct fluid onto the first component through the nozzle orifice. The second component is mated with and configured to translate along the guide rail.

According to another aspect of the present disclosure, another assembly is provided for rotational equipment. This assembly includes a first component, a static structure, a guide rail and a second component. The guide rail is mounted to the static structure. The guide rail includes a guide rail fluid passage and a nozzle. The nozzle includes a nozzle orifice fluidly coupled with the guide rail fluid passage. The nozzle orifice has a nozzle orifice centerline with a trajectory that is coincident with the first component. The second component is mated with and configured to translate along the guide rail.

According to still another aspect of the present disclosure, an assembly is provided for a gas turbine engine. This assembly includes a static guide rail and a seal carrier. The static guide rail includes a guide rail fluid passage and a nozzle. The nozzle includes a nozzle orifice fluidly coupled with the guide rail fluid passage. A centerline of the guide rail fluid passage is angularly offset from a centerline of the nozzle orifice by an included angle. The seal carrier is mated with and configured to translate along the static guide rail.

The included angle may be an obtuse angle or an acute angle

The first component may be configured as or otherwise include a roller element bearing.

The first component may be configured as or otherwise include a seal land.

The first component may be configured as or otherwise include a compartment wall.

The static structure may include the compartment wall.

The assembly may also include a seal land and a seal element. The seal land may be configured to rotate about an axial centerline. The seal element may be mounted to a seal carrier. The seal element may be configured to sealingly engage the seal land. The second component may be configured as or otherwise include the seal carrier.

The first component may be configured as or otherwise include a bearing.

The first component may include an inner race, an outer race and a plurality of bearing elements. The outer race may circumscribe the inner race. The bearing elements may be arranged between and may be engaged with the inner race and the outer race.

The nozzle may be configured to direct the fluid into a gap between the inner race and the outer race through the nozzle orifice.

The second component may be configured as or otherwise include a seal carrier.

The assembly may include a seal land and a seal element. The seal land may be configured to rotate about an axial centerline. The seal element may be mounted to the seal carrier. The seal element may be configured to sealingly engage the seal land.

The seal land may be axially adjacent the first component.

The seal element may be configured as or otherwise include a carbon seal element.

The assembly may also include a spring element configured to bias the seal carrier away from the static structure.

The assembly may also include a plurality of guide rails that include the guide rail. The guide rails may be arranged in an array about a centerline. The second component may be mated with and configured to translate along each of the plurality of guide rails.

The guide rail may be configured as or otherwise include a hollow pin.

The guide rail may be mounted to the static structure by an interface connection between the guide rail and the static structure.

The guide rail may extend longitudinally between a guide rail first end and a guide rail second end. The guide rail may be mounted to the static structure at the guide rail first end. The nozzle may be arranged at the guide rail second end.

A centerline of the guide rail fluid passage may be angularly offset from a centerline of the nozzle orifice by an angle.

The angle may be an obtuse angle. The angle may alternatively be an acute angle.

The rotational equipment may be configured as or otherwise include a gas turbine engine. The first component may be configured as a first component of the gas turbine engine. The second component may be configured as a second component of the gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
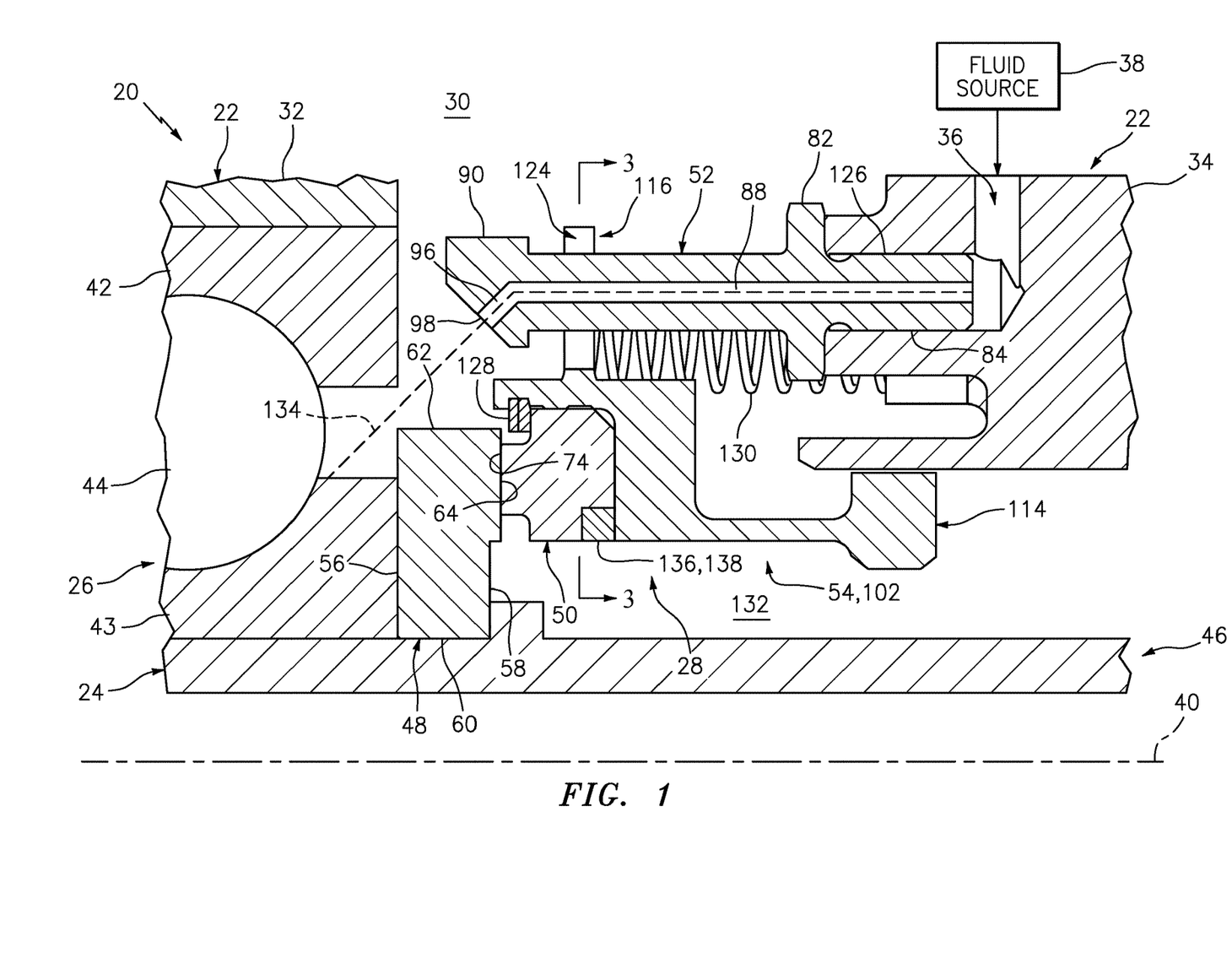
FIG. 1 is a partial side sectional illustration of an assembly for a piece of rotational equipment such as a gas turbine engine.

FIG. 1 is a partial side sectional illustration of an assembly 20 for a piece of rotational equipment. The piece of rotational equipment may be configured as a gas turbine engine for an aircraft propulsion system such as, but not limited to, a geared or direct-drive turbofan gas turbine engine. However, the assembly 20 of the present disclosure is not limited to such an aircraft application nor a gas turbine engine application. The assembly 20, for example, may alternatively be configured with rotational equipment such as an industrial gas turbine engine, a wind turbine, a water turbine or any other apparatus which includes a seal assembly for sealing a gap between a rotating component and a static/fixed component.

The assembly 20 of FIG. 1 includes a static structure 22, a rotating structure 24 and at least one bearing 26 for rotatably supporting the rotating structure 24 relative to the static structure 22. The assembly 20 of FIG. 1 also includes a seal assembly 28.

The static structure 22 is configured as a stationary part of the rotational equipment. The static structure 22 of FIG. 1, for example, is configured to at least partially form an internal bearing compartment 30 for housing at least the bearing 26. This static structure 22 includes a bearing support 32 such as, but not limited to, a strut. The static structure 22 also includes a seal assembly support 34; e.g., an annular wall. The seal assembly support 34 of FIG. 1 is configured with an internal static structure fluid passage 36 which extends within the static structure 22 and, more particularly, the seal assembly support 34. The static structure fluid passage 36 is configured to receive fluid (e.g., lubricant, coolant, etc.) from a fluid source 38 such as, but not limited to, a reservoir, pump, etc.

The rotating structure 24 is rotatable about an axial centerline 40, which centerline 40 may be an axial centerline and/or a rotational axis of the rotational equipment. The rotating structure 24 of FIG. 1 is configured as a tubular shaft. However, in other embodiments, the rotating structure 24 may be configured as another component (e.g., a sleeve) mounted to and rotatable with a shaft of the rotational equipment, or any other rotor within the rotational equipment. The rotating structure 24 of FIG. 1 extends axially along the axial centerline 40 through (or partially into or within) the static structure 22. The static structure 22 of FIG. 1 thereby extends circumferentially about (e.g., completely around) the axial centerline 40 and the rotating structure 24.

The bearing 26 may be configured as a roller element bearing. The bearing 26 of FIG. 1, for example, includes an annular outer race 42, an annular inner race 43 and a plurality of bearing elements 44; e.g., cylindrical or spherical elements. The outer race 42 circumscribes the inner race 43 and the bearing elements 44. The outer race 42 is mounted to the static structure 22 and, more particularly, the bearing support 32. The inner race 43 circumscribes and is mounted to the rotating structure 24. The bearing elements 44 are arranged in an annular array about the axial centerline 40, which array is radially between and engaged with the outer race 42 and the inner race 43. The present disclosure, however, is not limited to the foregoing exemplary bearing configuration. For example, in other embodiments, the bearing 26 may alternatively be configured as a journal bearing or any other type of bearing utilized in the rotational equipment.

The seal assembly 28 is configured to seal an annular gap between a rotating assembly 46 and the static structure 22, which rotating assembly 46 includes at least the rotating structure 24. The seal assembly 28 of FIG. 1, for example, is configured to seal the gap which extends (e.g., radially and/or axially) between the static structure 22 and the rotating structure 24. Of course, in other embodiments, the seal assembly 28 may seal a gap extending between the static structure 22 and another rotating component mounted to and/or rotatable with the rotating structure 24.

The seal assembly 28 of FIG. 1 includes an annular seal land 48 and an annular seal element 50; e.g., a carbon seal element. The seal assembly 28 of FIG. 1 also includes one or more guide rails 52 and a seal support assembly 54.

The seal land 48 is configured with a full hoop body that extends circumferentially about the axial centerline 40. The seal land 48 extends axially along the axial centerline 40 between an axial first end 56 and an axial second end 58. The seal land 48 extends radially between a radial inner side 60 and a radial outer side 62.

The seal land 48 includes an annular, radially extending seal land surface 64 located at (e.g., on, adjacent or proximate) the axial second end 58. This seal land surface 64 may be an uninterrupted surface. The seal land surface 64, for example, may be a flat planar surface configured without circumferential and/or radial interruptions such as, but not limited to, channels, slots and apertures. Of course, in other embodiments, the seal land surface 64 may be circumferentially and/or radially interrupted by one or more channels, slots, apertures and/or other types of surface interruptions.

Figure 2:
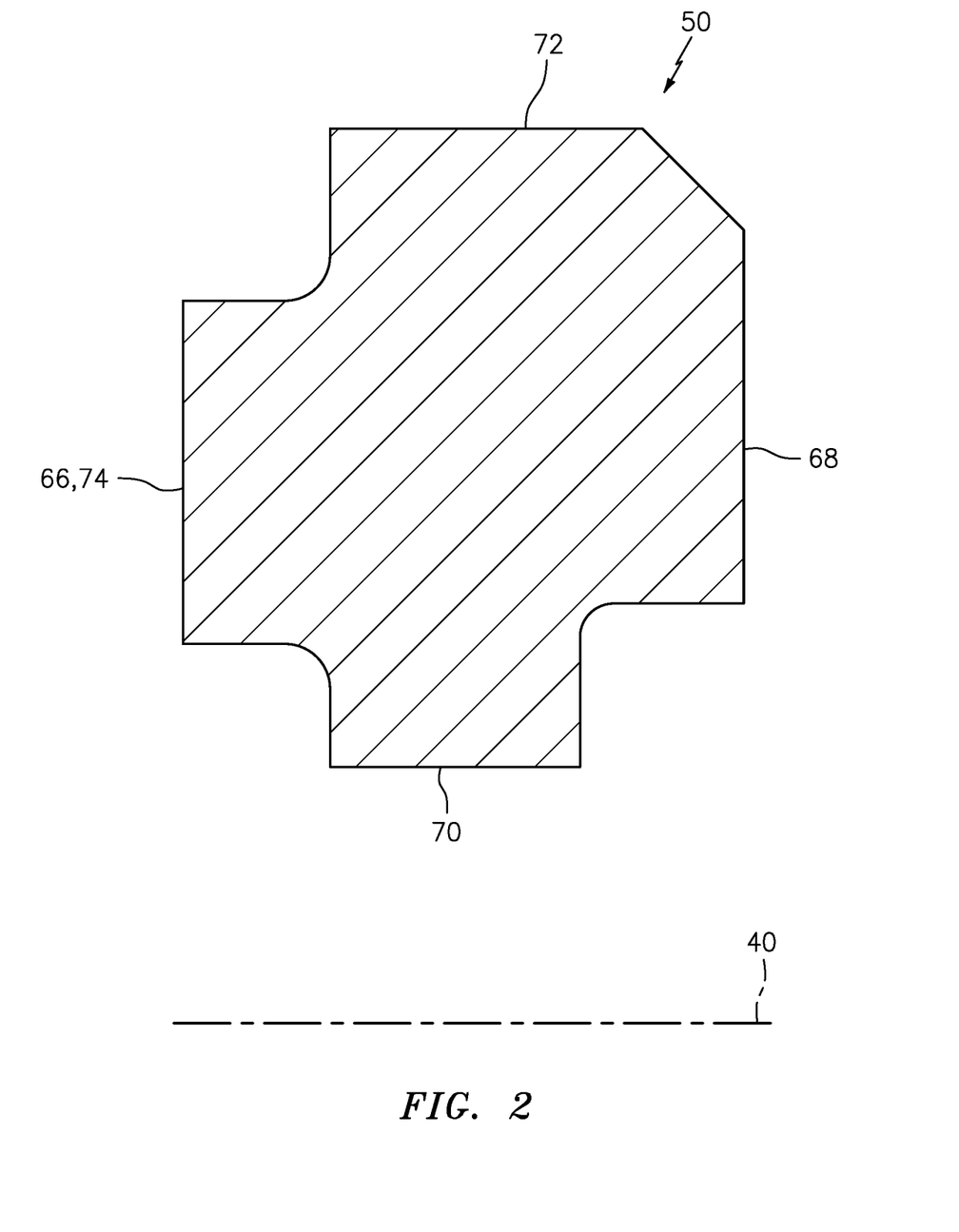
FIG. 2 is a partial side sectional illustration of a seal element.

Referring to FIG. 2, the seal element 50 is configured with a full hoop body that extends circumferentially about the axial centerline 40. This full hoop body may be a single unitary body; e.g., a monolithic body. Alternatively, the full hoop body may be a segmented body; e.g., the seal element 50 may be configured from an array of arcuate seal element segments. The seal element 50 extends axially along the axial centerline 40 between an axial first end 66 and an axial second end 68. The seal element 50 extends radially between a radial inner side 70 and a radial outer side 72.

The seal element 50 includes an annular, radially extending seal element surface 74 located at (e.g., on, adjacent or proximate) the axial first end 66. This seal element surface 74 may be an uninterrupted surface. The seal element surface 74, for example, may be a flat planar surface configured without circumferential and/or radial interruptions such as, but not limited to, channels, slots and apertures. Of course, in other embodiments, the seal element surface 74 may be circumferentially and/or radially interrupted by one or more channels, slots, apertures and/or other types of surface interruptions.

Figure 3:
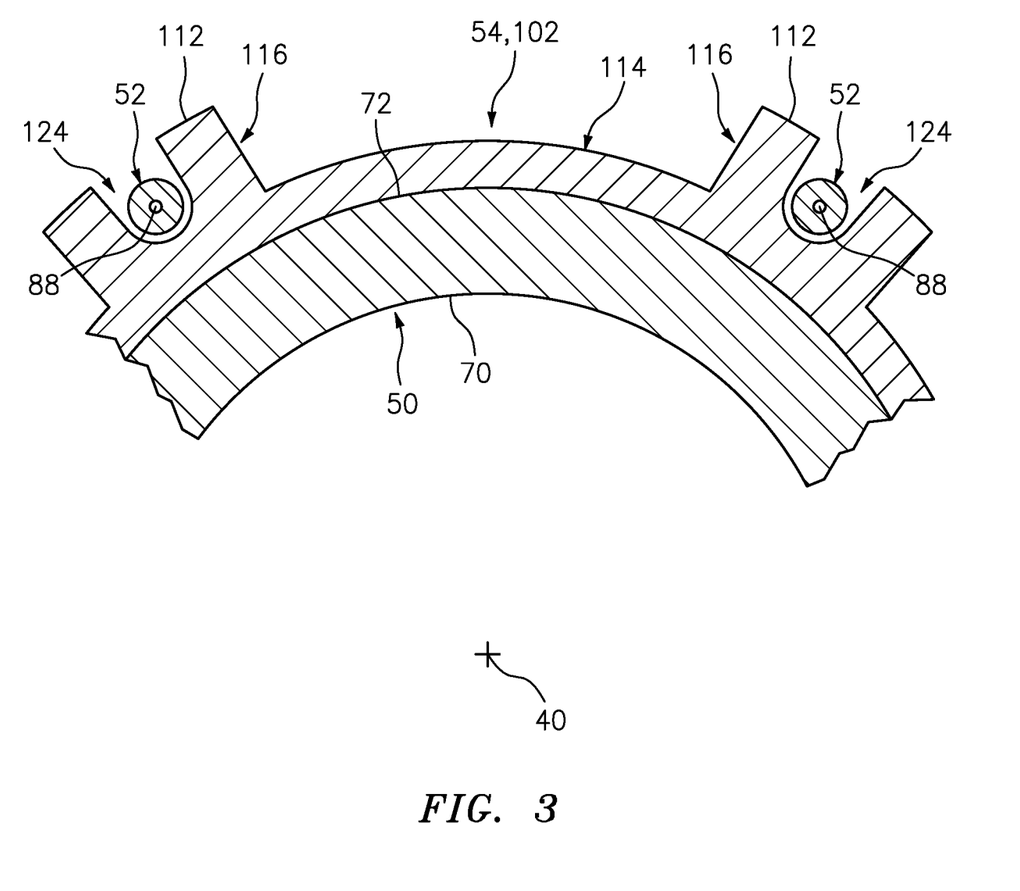
FIG. 3 is a cross-sectional illustration of a portion of the assembly taken along line 3-3 in FIG. 1.
Figure 4:
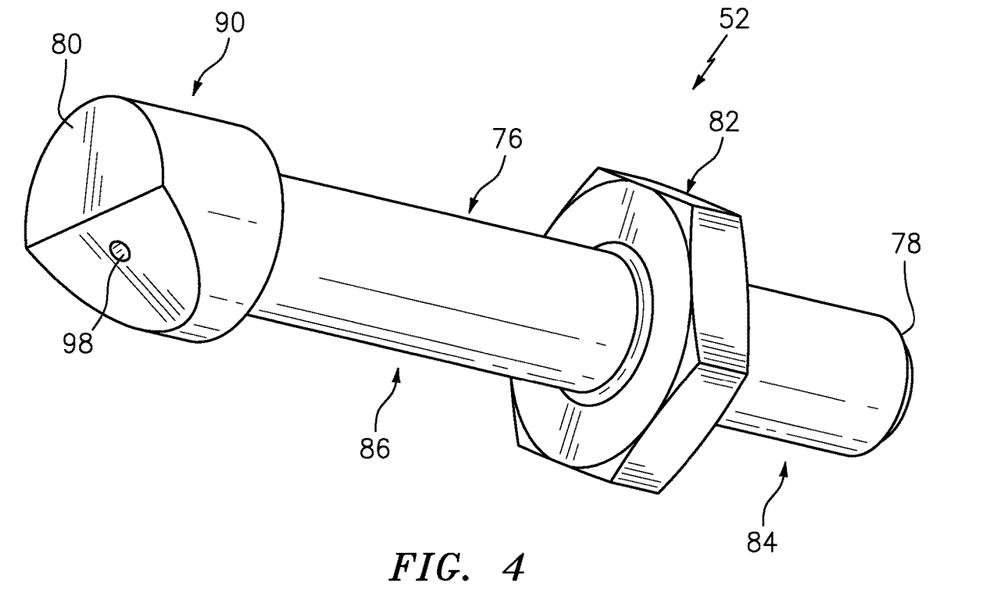
FIG. 4 is a perspective illustration of a guide rail configured with a nozzle.
Figure 5:
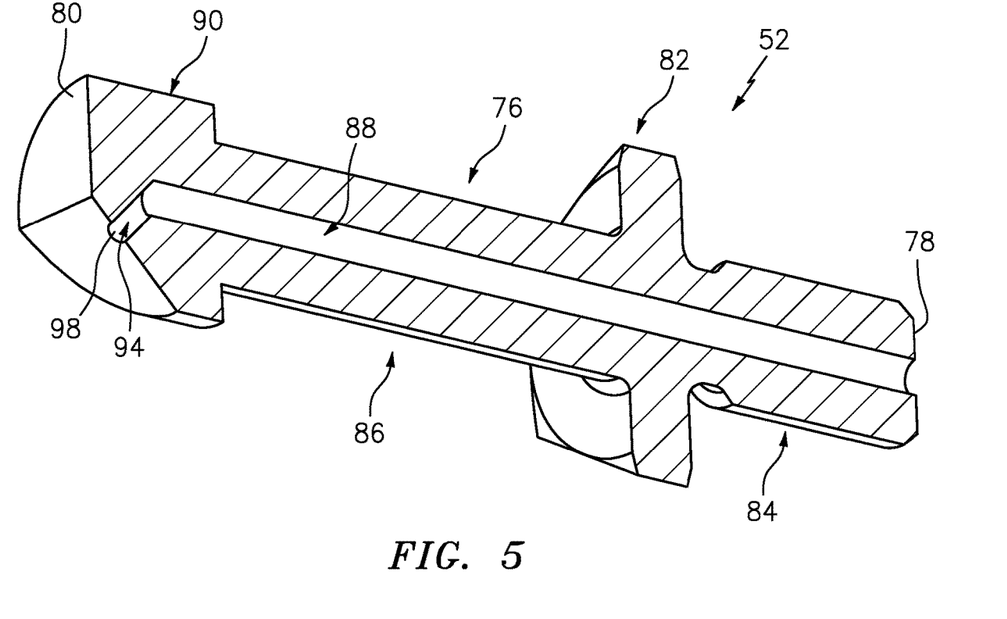
FIG. 5 is a sectional perspective illustration of the guide rail.
Figure 6:
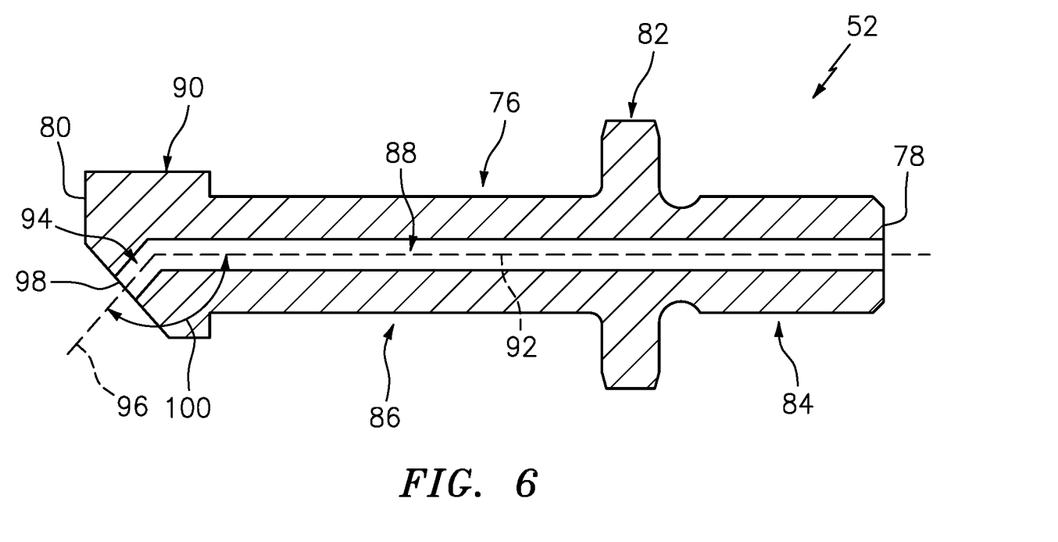
FIG. 6 is a side sectional illustration of the guide rail.

Referring to FIG. 3, the guide rails 52 are arranged circumferentially about the axial centerline 40 in an annular array. Referring to FIGS. 4-6, each of the guide rails 52 may be configured as or otherwise include a guide pin. For example, each guide rail 52 of FIG. 4 may have, but is not limited to, a generally cylindrical body 76 that extends axially between an axial first end 78 and an axial second end 80. A generally annular flange 82 may project out from and circumscribes the body 76. This flange 82 may be configured with a polygonal (e.g., hexagonal) peripheral cross-sectional geometry adapted for mating with an installation tool such as, but not limited to, a wrench or a socket. An axial first portion 84 of the body 76, axially between the axial first end 78 and the flange 82, may be configured with threads; e.g., the portion is a threaded portion. An axial second portion 86 of the body 76, axially between the axial second end 80 and the flange 82, may be configured with a smooth cylindrical surface.

Referring to FIG. 6, at least one, some or all of the guide rails 52 is each respectively configured with an internal guide rail fluid passage 88 (e.g., a pin fluid passage) and a fluid delivery nozzle 90. The guide rail fluid passage 88 includes/is formed by a (e.g., single) passageway through the guide rail 52. This passageway includes/is formed by a bore. This bore extends along a centerline 92 of the guide rail fluid passage 88 partially into the guide rail 52 from the axial first end 78 to the nozzle 90.

The nozzle 90 is disposed at the axial second end 80. The nozzle 90 is configured with an internal nozzle fluid passage 94. The nozzle fluid passage 94 includes/is formed by a (e.g., single) passageway through the nozzle 90. This passageway includes/is formed by a bore. This bore extends along a nozzle orifice centerline 96 from the guide rail fluid passage 88 to an orifice 98 of the nozzle 90. The nozzle fluid passage 94 thereby extends between and fluidly couples the guide rail fluid passage 88 to the nozzle orifice 98.

The nozzle orifice centerline 96 is angularly offset from the guide rail fluid passage centerline 92 by an included angle 100; e.g., an obtuse angle or an acute angle. The centerlines 92 and 96, for example, may be angularly offset by between one hundred and ten degrees (110°) and one hundred and sixty degrees (160°). The present disclosure, however, is not limited to such exemplary angles. For example, in other embodiments, the angle 100 may be less than one hundred and ten degrees (110°) or greater than one hundred and sixty degrees (160°). Note, in some embodiments, the respective guide rail 52 may be configured with more than one nozzle fluid passage 94 and/or nozzle orifice 98.

Referring to FIG. 1, the seal support assembly 54 is configured to translate axially along the guide rails 52. The seal support assembly 54 is also configured to support the seal element 50. The seal support assembly 54 of FIG. 1, for example, is configured as or otherwise includes a seal carrier 102.

Figure 7:
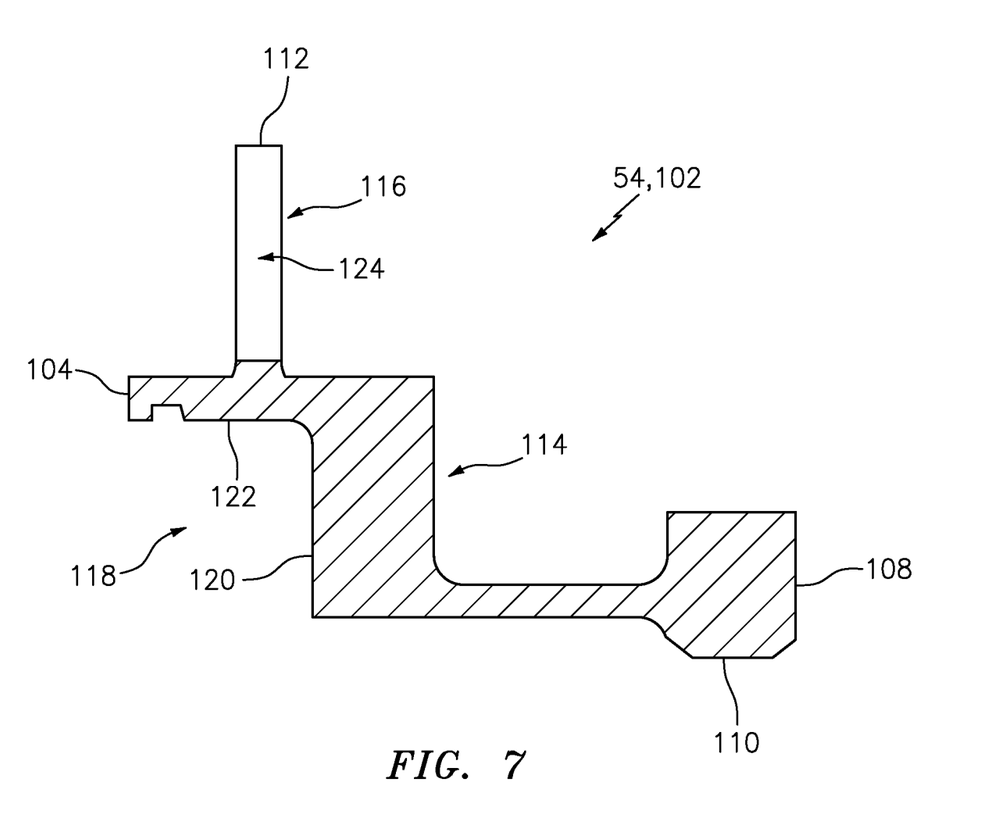
FIG. 7 is a partial side sectional illustration of a seal carrier.

Referring to FIG. 7, the seal carrier 102 is configured with a full hoop body that extends circumferentially about the axial centerline 40; see also FIG. 3. The seal carrier 102 extends axially along the axial centerline 40 between an axial first end 104 and an axial second end 108. The seal carrier 102 extends radially, relative to the axial centerline 40, between a radial inner side 110 and a radial outer side 112.

The seal carrier 102 of FIG. 7 includes a tubular carrier base 114 and one or more carrier flanges 116; see also FIG. 3. The base 114 is configured with an annular recess/notch 118. This recess 118 extends axially partially into the base 114 from the axial first end 104 to an (e.g., annular) axial end surface 120. The recess 118 extends radially partially into the base 114 from the radial inner side 110 to a (e.g., tubular) radial end surface 122. The recess 118 forms a receptacle for the seal element 50 as described below in further detail.

Referring to FIG. 3, the flanges 116 are arranged circumferentially about the base 114. Each flange 116 includes a slot 124.

Referring to FIG. 1, the seal land 48 is arranged with the rotating structure 24 in such a manner so as to be rotatable with the rotating structure 24 about the axial centerline 40. The seal land 48 of FIG. 1, for example, circumscribes and is fixedly mounted to the rotating structure 24; e.g., clamped between the inner race 43 and a shoulder on the rotating structure 24.

The guide rails 52 are fixedly mounted to the static structure 22. For example, the threaded portion 84 of each guide rail 52 may be screwed into a corresponding tapped hole 126 in the static structure 22. Each guide rail 52 is thereby connected to the static structure 22 by a threaded interface. However, in other embodiments, each guide rail 52 may also or alternatively be connected to the static structure 22 through another type of interface connection; e.g., staking, riveting, press fitting, bolting, etc.

The seal element 50 is seated in the receptacle of the seal carrier 102. A split ring 128 and/or another device secures the seal element 50 within the receptacle such that the seal element 50 is fixedly mounted to the seal carrier 102. Of course, the seal element 50 may also or alternatively be mounted to the seal carrier 102 using other fastening and/or bonding techniques.

The seal carrier 102 is mated with the guide rails 52. In particular, each of the guide rails 52 projects through a respective flange slot 124; see also FIG. 3.

One or more spring elements 130 may be arranged between the static structure 22 and the seal carrier 102. These spring elements 130 are configured to bias the seal carrier 102 and, thus, the seal element 50 away from the static structure 22 and towards the seal land 48. In particular, the spring elements 130 cause the surfaces 64 and 74 to axially sealingly engage (e.g., contact) one another.

During operation, the seal element 50 sealingly engages the seal land 48. A combination of at least the seal element 50 and the seal support assembly 54 seal a gap between the seal land 48 and the static structure 22 and thereby fluidly divide (e.g., separate, isolate) the bearing compartment 30 from another plenum 132.

In addition, in order to cool and/or provide lubrication to the bearing 26 (e.g., interfaces between the bearing elements 44 and the races 42 and 43), each static structure fluid passage 36 supplies fluid (e.g., lubricant, coolant, oil, etc.) to a respective one of the guide rail fluid passages 88. Each guide rail fluid passage 88 supplies this received fluid to a respective one of the nozzles 90. Each nozzle 90 is configured to direct the received fluid out of its nozzle orifice 98 along the nozzle orifice centerline 96 towards the bearing 26. The fluid injected/discharged by the nozzle 90 may travel along a trajectory 134 that extends to (e.g., is coincident with) the bearing 26 and one or more of its components 42-44 (e.g., the inner race 43).

In some embodiments, the assembly 20 may also include one or more secondary seals 136. The assembly 20 of FIG. 1, for example, includes an annular secondary seal element 138 axially between the seal element 50 and the seal carrier 102. This secondary seal element 138 is configured to separate cooling fluids from boundary fluids.

Figure 8:
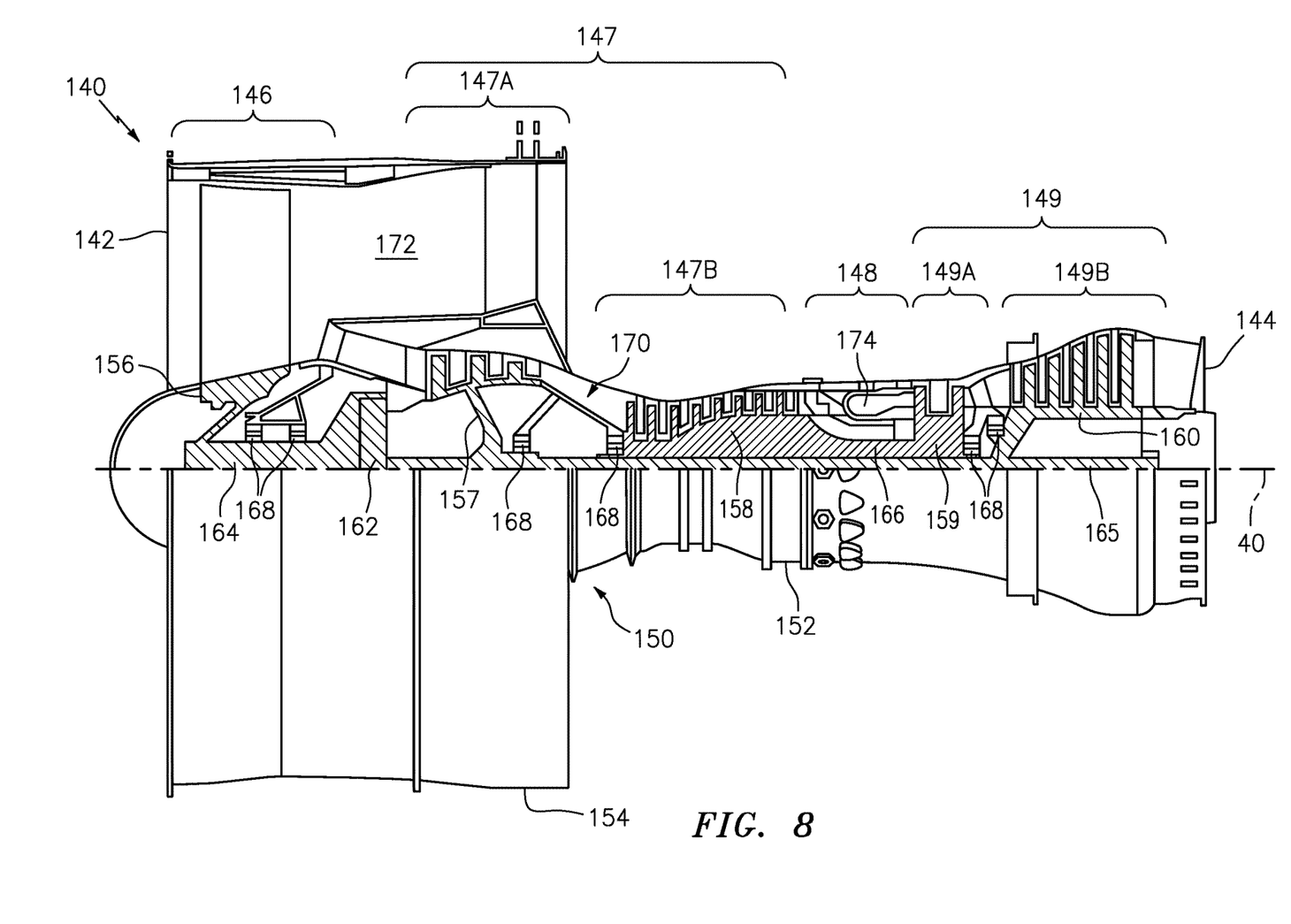
FIG. 8 is a side cutaway illustration of a geared turbine engine with which the assembly of FIG. 1 may be configured.

FIG. 8 is a side cutaway illustration of a geared turbine engine 140 with which the assembly 20 of FIG. 1 may be configured. The turbine engine 140 extends along an axial centerline (e.g., the centerline 40) between an upstream airflow inlet 142 and a downstream airflow exhaust 144. The turbine engine 140 includes a fan section 146, a compressor section 147, a combustor section 148 and a turbine section 149. The compressor section 147 includes a low pressure compressor (LPC) section 147A and a high pressure compressor (HPC) section 147B. The turbine section 149 includes a high pressure turbine (HPT) section 149A and a low pressure turbine (LPT) section 149B.

The engine sections 146-149B are arranged sequentially along the centerline 40 within an engine housing 150. This housing 150 includes an inner case 152 (e.g., a core case) and an outer case 154 (e.g., a fan case). The inner case 152 may house one or more of the engine sections 147A-149B; e.g., an engine core. This inner case 152 may include or may be connected to the static structure 22 of FIG. 1. The outer case 154 may house at least the fan section 146.

Each of the engine sections 146, 147A, 147B, 149A and 149B includes a respective rotor 156-160. Each of these rotors 156-160 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 156 is connected to a gear train 162, for example, through a fan shaft 164. The gear train 162 and the LPC rotor 157 are connected to and driven by the LPT rotor 160 through a low speed shaft 165. The HPC rotor 158 is connected to and driven by the HPT rotor 159 through a high speed shaft 166. The shafts 164-166 are rotatably supported by a plurality of bearings 168; e.g., rolling element and/or thrust bearings. Each of these bearings 168 is connected to the engine housing 150 by at least one stationary structure such as, for example, an annular support strut. The rotating structure 24 of FIG. 1 may be configured as any one of the shafts 164-166 or a component rotatable therewith, and the bearing 26 of FIG. 1 may be configured as any one of the bearings 168.

During operation, air enters the turbine engine 140 through the airflow inlet 142. This air is directed through the fan section 146 and into a core gas path 170 and a bypass gas path 172. The core gas path 170 extends sequentially through the engine sections 147A-149B. The air within the core gas path 170 may be referred to as "core air". The bypass gas path 172 extends through a bypass duct, which bypasses the engine core. The air within the bypass gas path 172 may be referred to as "bypass air".

The core air is compressed by the compressor rotors 157 and 158 and directed into a combustion chamber 174 of a combustor in the combustor section 148. Fuel is injected into the combustion chamber 174 and mixed with the compressed core air to provide a fuel-air mixture. This fuel air mixture is ignited and combustion products thereof flow through and sequentially cause the turbine rotors 159 and 160 to rotate. The rotation of the turbine rotors 159 and 160 respectively drive rotation of the compressor rotors 158 and 157 and, thus, compression of the air received from a core airflow inlet. The rotation of the turbine rotor 160 also drives rotation of the fan rotor 156, which propels bypass air through and out of the bypass gas path 172. The propulsion of the bypass air may account for a majority of thrust generated by the turbine engine 140, e.g., more than seventy-five percent (75%) of engine thrust. The turbine engine 140 of the present disclosure, however, is not limited to the foregoing exemplary thrust ratio.

Figure 9:
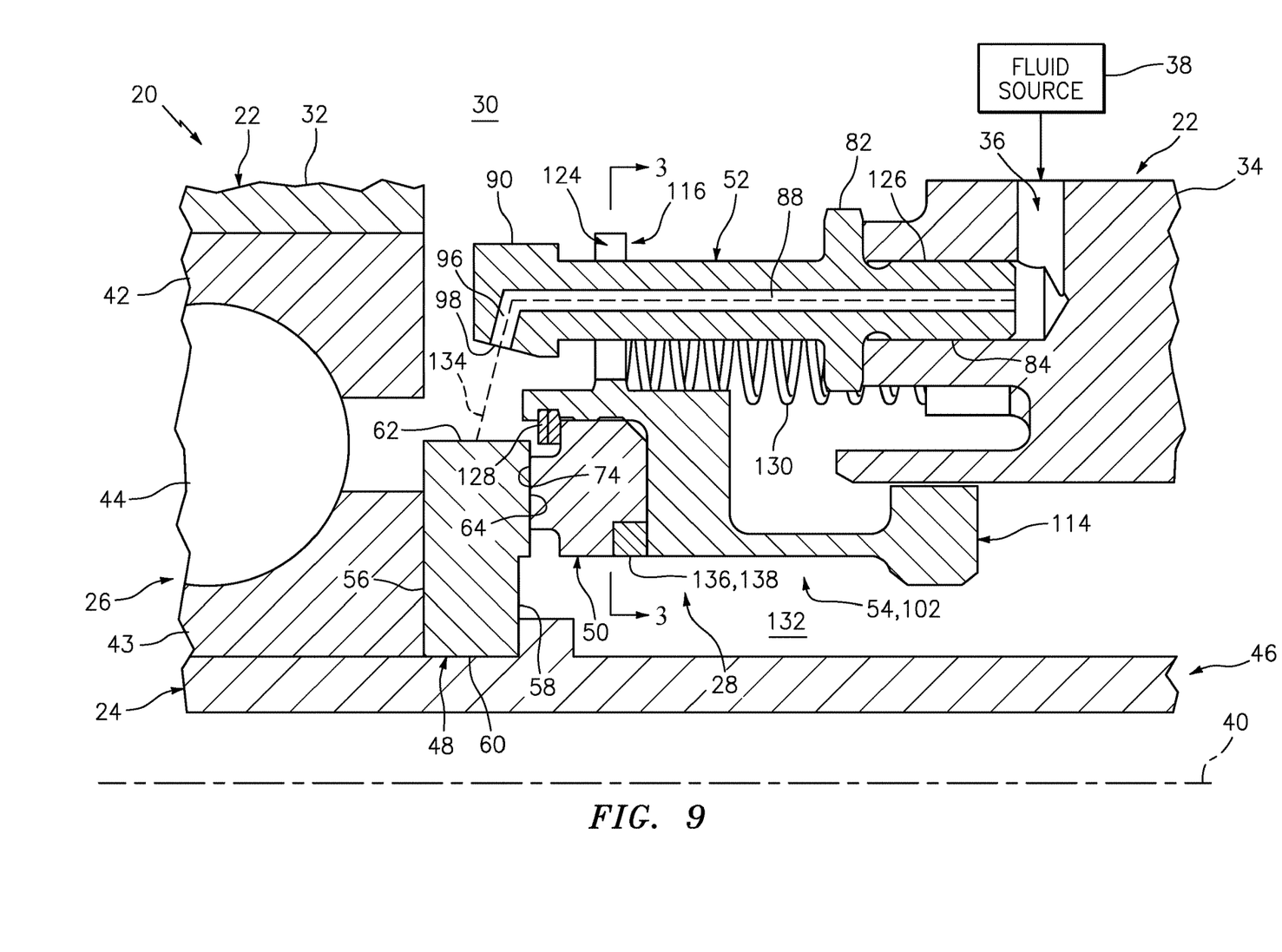
FIG. 9 is a partial side sectional illustration of the assembly of FIG. 1 with an alternative guide rail.
Figure 10:
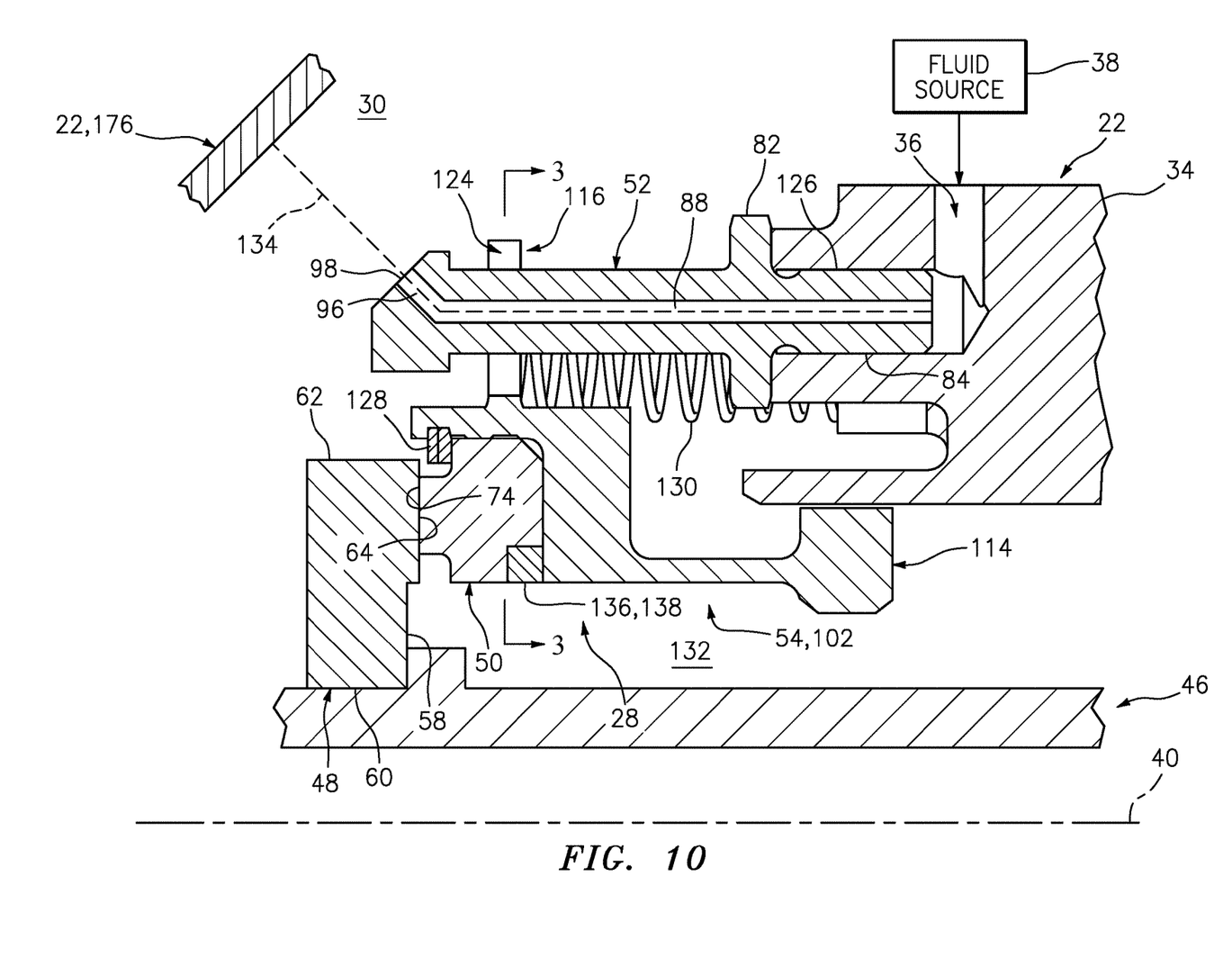
FIG. 10 is a partial side sectional illustration of the assembly of FIG. 1 with another alternative guide rail.

While each nozzle 90 is described above as directing the fluid towards (e.g., to) the bearing 26, one or more or each of the nozzles 90 may also or alternatively be configured to direct the fluid towards another component within the rotational equipment (e.g., the gas turbine engine 140). For example, the fluid may be directed to the seal land 48 (e.g., see FIG. 9), a wall 176 of the compartment 30 (e.g., see FIG. 10), an oil scoop, a seal seat and/or another component within the bearing compartment 30 or elsewhere that needs cooling and/or lubrication. The present disclosure therefore is not limited to delivering the fluid to any particular rotational equipment components.

While each guide rail 52 is described above as guiding movement (e.g., translation) of the seal support assembly 54 and its carrier 102, one or more or each of the guide rails 52 may also or alternatively be configured for guiding movement (e.g., translation) of another component within the rotational equipment (e.g., the gas turbine engine 140).

The assembly 20 may be included in various turbine engines other than the one described above as well as in other types of rotational equipment. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 8), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
   a first component;
   a static structure comprising a static structure fluid passage;
   a guide rail mounted to the static structure, the guide rail comprising a guide rail fluid passage and a nozzle, the guide rail fluid passage fluidly coupling the static structure fluid passage to a nozzle orifice of the nozzle, and the nozzle configured to direct fluid onto the first component through the nozzle orifice; and
   a second component mated with and configured to translate along the guide rail.

2. The assembly of claim 1, wherein the first component comprises a bearing.

3. The assembly of claim 1, wherein the first component comprises a seal land.

4. The assembly of claim 1, wherein the first component comprises a compartment wall.

5. The assembly of claim 1, wherein the first component includes
   an inner race;
   an outer race circumscribing the inner race; and a plurality of bearing elements arranged between and engaged with the inner race and the outer race.

6. The assembly of claim 5, wherein the nozzle is configured to direct the fluid into a gap between the inner race and the outer race through the nozzle orifice.

7. The assembly of claim 1, wherein the second component comprises a seal carrier.

8. The assembly of claim 7, further comprising:
a seal land configured to rotate about an axial centerline; and
a seal element mounted to the seal carrier, the seal element configured to sealingly engage the seal land.

9. The assembly of claim 8, wherein the seal land is axially adjacent the first component.

10. The assembly of claim 8, wherein the seal element comprises a carbon seal element.

11. The assembly of claim 7, further comprising a spring element configured to bias the seal carrier away from the static structure.

12. The assembly of claim 1, further comprising:
a plurality of guide rails comprising the guide rail, the plurality of guide rails arranged in an array about a centerline; and
the second component mated with and configured to translate along each of the plurality of guide rails.

13. The assembly of claim 1, wherein the guide rail comprises a hollow pin.

14. The assembly of claim 1, wherein the guide rail is mounted to the static structure by an interface connection between the guide rail and the static structure.

15. The assembly of claim 1, wherein
the guide rail extends longitudinally between a guide rail first end and a guide rail second end;
the guide rail is mounted to the static structure at the guide rail first end; and
the nozzle is arranged at the guide rail second end.

16. The assembly of claim 1, wherein a centerline of the guide rail fluid passage is angularly offset from a centerline of the nozzle orifice by an angle.

17. The assembly of claim 1, wherein
the rotational equipment comprises a gas turbine engine;
the first component is configured as a first component of the gas turbine engine; and
the second component is configured as a second component of the gas turbine engine.

18. An assembly for rotational equipment, comprising:
a first component;
a static structure;
a guide rail mounted to the static structure, the guide rail comprising a guide rail fluid passage and a nozzle, the nozzle comprising a nozzle orifice fluidly coupled with the guide rail fluid passage, and the nozzle orifice having a nozzle orifice centerline with a trajectory that is coincident with the first component; and
a second component mated with and configured to translate along the guide rail.

19. The assembly of claim 18, further comprising:
a seal land configured to rotate about an axial centerline; and
a seal element mounted to a seal carrier, the seal element configured to sealingly engage the seal land;
the second component comprising the seal carrier.

20. An assembly for a gas turbine engine, comprising:
a static guide rail comprising a guide rail fluid passage and a nozzle, the nozzle comprising a nozzle orifice fluidly coupled with the guide rail fluid passage, and a centerline of the guide rail fluid passage angularly offset from a centerline of the nozzle orifice by an included angle; and
a seal carrier mated with and configured to translate along the static guide rail.

* * * * *